United States Patent Office 3,031,265
Patented Apr. 24, 1962

3,031,265
METHOD FOR MAKING CYANOGEN
Herbert Zima, Darmstadt-Eberstadt, Germany, assignor to Rohm & Haas G.m.b.H., Darmstadt, Germany
No Drawing. Filed Jan. 19, 1960, Ser. No. 3,238
Claims priority, application Germany Jan. 24, 1959
9 Claims. (Cl. 23—151)

This invention relates to a method for the preparation of cyanogen.

It has been found that hydrogen cyanide can be catalytically decomposed in a simple manner according to the reaction $$2HCN \rightarrow (CN)_2 + H_2$$

by passing it over metals of group VIB of the periodic table, platinum metals of group VIII of the periodic table, or oxides of metals of groups IVB, VB, and VIB of the periodic table at temperatures between about 300° and about 800° C., preferably at temperatures between about 500° and about 700° C.

The catalysts named above show a surprisingly high selectivity for the decomposition of hydrogen cyanide according to the reaction shown, and thus make possible the preparation of cyanogen in a commercially feasible process. The high efficiency of the present process distinguishes it from processes yielding cyanogen by a purely thermal decomposition of HCN. Such thermal processes produce only small amounts of cyanogen contaminated with hydrogen, nitrogen, and carbon. The present catalytic decomposition is also to be distinguished from oxidation processes using HCN, which latter processes lead to a considerable formation of cyanic acid, HCNO, rather than cyanogen.

The catalyst metals and metal oxides can be used alone or in combination with each other. Thus, two or more metals may be formed into a mixture or alloy, and two or more oxides may be mixed. Also, the metals may be used in combination with the catalytic oxides. It is particularly advantageous to employ mixtures of the named metals, which mixtures bring about a surprising increase in the amount of HCN decomposed and in the yield of cyanogen produced. For example, using mixed catalysts of the kind described, hydrogen cyanide can be converted to cyanogen in yields up to 98 percent of the decomposed HCN. Although catalysts of the mixed pure metals are of primary interest, metallic mixtures or alloys of metals of groups VIB and VIII of the periodic table with minor amounts of other metals, such as those of group IB of the periodic table, are also highly effective catalysts and are comprised within the scope of the present invention.

In practice, the metallic catalysts of the invention may conveniently be fashioned into a mesh, or into other shapes having a large surface area. It is especially advantageous to precipitate the metals on a carrier substance such as charcoal, kieselguhr, or the like. Using methods known to those skilled in the art, a metal oxide can first be formed on a carrier substance, and then this oxide can be reduced to the pure metal. Highly effective contact between the catalyst and the reagent can also be obtained by treating a carrier material such as activated charcoal with a solution of salts of the named metals, e.g. the ammonium salts, and then converting the salts to the free metal directly on the carrier.

Numerous materials, such as metals of the iron group, bring about a decomposition of hydrogen cyanide with production of undesirable by-products other than cyanogen. To avoid reactions of this type, it is advantageous to fashion the reaction vessel in which the decomposition reaction proceeds out of a catalyst metal of the kind described herein, or to line the reaction vessel with such metals.

The oxides of metals of groups IVB, VB, and VIB of the periodic table can be used as catalysts either alone or simultaneously with the free metals already mentioned. For example, the free metals may be deposited on the catalyst oxides as carriers. Catalysts of high efficiency can also be produced by partially reducing an oxide of a metal of group VIB of the periodic table, alone or in a mixture of other oxides, whereby a catalytic mixture of oxide and free metal is obtained.

In using the oxides of metals of groups IVB, VB, and VIB, it is particularly advantageous to form mixtures of these oxides, and/or to deposit the oxides or oxide mixtures in finely-divided form on carrier substances, particularly carriers which are also materials showing catalytic activity for the reaction. Using methods obvious to those skilled in the art, for example, carbonates of the catalyst materials mentioned can be deposited on a carrier material such as chromium oxide, kieselguhr, and the like. The impregnated solids are filtered, formed into granules, dried, and the carbonates are then converted to the corresponding oxides by firing. Similarly, a carrier material such as activated charcoal can be moistened with a solution of a decomposable salt of the metals which have catalytically active oxides. The carrier so prepared is then formed, dried, and heated until the salt contained thereon is converted to the oxide.

To avoid decomposition of hydrogen cyanide according to reactions other than that desired, it is also advantageous to fashion the reaction vessel in which the decomposition takes place from the oxide catalysts of the invention, for example from zirconium dioxide. In such a vessel, the simultaneous presence of other catalytic materials promoting the formation of cyanogen, for example the metals of groups VIB and VIII of the periodic table, has advantage in many cases.

The catalytic oxides which can be used to greatest advantage in the decomposition of hydrogen cyanide are the oxides of titanium, zirconium, thorium, vanadium, tantalum, chromium, molybdenum, tungsten, and uranium. Molybdenum, tungsten, palladium, and platinum are the free metals most efficient for catalyzing the reaction.

When passing HCN over the catalysts of the present invention, it has proved desirable, but not necessary, to dilute the gas with an inert gas, conveniently nitrogen. The dilution is made with from 0.5 to 2 parts by volume of inert gas per part of hydrogen cyanide, preferably in a volume ratio of 1:1 for the two gases.

The cyanogen formed by the reaction can easily be separated from any hydrogen cyanide remaining unconverted. The separation may be accomplished, for example, by cooling the gas mixture leaving the reaction zone and then passing the cooled gas mixture into a column cooled to a temperature (e.g. —10° C.) between the boiling point of hydrogen cyanide (+26° C.) and the boiling point of cyanogen (—21.4° C.). Hydrogen and cyanogen containing only minor quantities of hydrogen cyanide as an impurity are withdrawn from the top of the column, while liquid HCN containing no more than about 1–3 percent of dissolved cyanogen is withdrawn at the bottom of the column. The HCN can be rerun through the reaction zone without further purification. Any traces of HCN remaining in the cyanogen product after the first separation can be fully and simply removed therefrom by washing the hydrogen-cyanogen mixture with water at about 20° C. in a packed column. By cooling the cyanogen thus freed of hydrogen cyanide to a temperature below —21.4° C., the condensed cyanogen can be separated from hydrogen. The final product is obtained in substantially pure form.

The practice of the invention is shown in the following specific examples, which are given by way of illustration.

Example 1

A platinum-palladium catalyst was prepared by mixing 129 ml. of a solution of platinic chloride acidified with hydrochloric acid and containing 4.955 grams of the dissolved metal, 7.14 ml. of a solution of palladium chloride containing 0.045 gram of the dissolved metal, and 20 grams of kieselguhr. The mixture was stirred for two hours at 50° C., after which 200 ml. of a 10 percent soda solution were added. 120 ml. of a 1 percent solution of hydrazine were then added dropwise over the course of one hour. For complete reduction of the salts to the free metal, the mixture was next boiled for 22 hours. The mixture was finally filtered, washed with distilled water, formed into granules while damp, and dried.

The granulated catalyst was packed into an electrically heated vertical quartz tube having an interior diameter of 22 mm. The height of the catalyst in the column was about 60 mm. A 1:1 volumetric mixture of hydrogen cyanide and nitrogen was preheated to 60° C. and passed over the catalyst at a temperature of 650° C. The spatial velocity of the hydrogen cyanide portion was 366. The yield of cyanogen, calculated on the amount of decomposed hydrogen cyanide, rose during the first hour from 46 percent to 98 percent, and then declined slowly after about 8 hours.

Example 2

A tungsten catalyst was prepared by dissolving 36.6 grams of ammonium paratungstate $(NH_4)_6W_7O_{24}\cdot 6H_2O$ in 1 liter of a 15 percent aqueous solution of methylamine. 50 grams of kieselguhr were added to the solution, and the resulting mixture was brought to the consistency of a thick sludge by heating on a steam bath with stirring. The moist mass was formed into granules which were then dried. The dry granules were first heated at 400° C. for 10 hours, and then reduced by heating at 810° C. in a stream of hydrogen.

The catalyst so prepared was packed into a quartz tube as described in Example 1. Contact with hydrogen cyanide was at a temperature of 600° C. A 28 percent yield of cyanogen, calculated on the amount of decomposed HCN, was obtained. After a few hours of operation, the selectivity of the catalyst decreased.

Example 3

A platinum-tungsten catalyst was prepared by dissolving ammonium paratungstate in concentrated aqueous ammonia with heating, and similarly dissolving ammonium chloroplatinate in a boiling 20 percent aqueous solution of ammonia. Portions of the two solutions were mixed to give a third solution containing 11.91 grams of dissolved platinum metal and 0.59 gram of dissolved tungsten. 50 grams of kieselguhr were added to this solution, and the resulting mixture was heated on a steam bath with stirring until a thick sludge resulted. After granulation and drying, the catalyst was heated to redness for 12 hours in a stream of hydrogen at 810° C. As in Example 1, the resulting catalyst was packed into a quartz tube. Contact with HCN took place at a temperature between 640° C. and 660° C. Maximum selectivity for the catalyst was observed after a few hours, and brought about a 93 percent conversion of the reactant. After about 5 hours, the selectivity of the catalyst slowly decreased.

Example 4

A zirconium oxide catalyst was prepared by dissolving 72.2 grams of basic zirconium nitrate, $ZrO(NO_3)_2\cdot 2H_2O$, in 150 ml. of water. 50 grams of kieselguhr were added to the solution and the mixture was heated on a steam bath with stirring until a thick sludge resulted. The mass was then formed into granules which were dried at 110° C. Decomposition of the zirconium nitrate was accomplished by heating the catalyst in a reaction tube for 4 hours at 800° C. in a stream of nitrogen.

The catalyst granules were then packed into an electrically heated vertical quartz tube having an interior diameter of 22 mm. The height of the catalyst in the tube was about 60 mm. A 1:1 volumetric mixture of hydrogen cyanide and nitrogen was preheated to a temperature of 60° C. and passed over the catalyst at a temperature of 600° C. The spatial velocity for the HCN portion was about 366. The yield of cyanogen, calculated on the amount of cyanic acid decomposed, rose during the first hours of operation, and after about 5 hours reached 40 percent. In the next hour, the yield rose to over 60 percent and then declined slowly.

Example 5

A thorium oxide catalyst was prepared by dissolving 27.9 grams of thorium nitrate, $Th(NO_3)_4\cdot 4H_2O$ in 250 ml. of water. 20 grams of kieselguhr were added to the solution, and the mixture was heated on a steam bath with stirring until it had the consistency of a thick sludge. The sludge was formed into granules and dried, and the thorium nitrate was decomposed by heating the granules at a temperature of 400° C.

The resulting catalyst was packed into a quartz tube as in Example 4. After several hours of operation, the yield of cyanogen, calculated on the amount of decomposed HCN, rose to 56 percent. After about 8 hours, the selectivity of the catalyst began to decline.

Although specific embodiments have been shown and described, it is to be understood they are illustrative, and are not to be construed as limiting on the scope and spirit of the invention.

I claim:

1. The method of making cyanogen by decomposition of hydrogen cyanide which comprises contacting hydrogen cyanide at a temperature of at least 300° C. with a platinum metal of group VIII of the periodic table as a catalyst.

2. The method as in claim 1 wherein said catalyst is an alloy of at least two platinum metals.

3. The method of making pure cyanogen by decomposition of hydrogen cyanide which comprises contacting hydrogen cyanide at a temperature of at least 300° C. with a platinum metal of group VIII of the periodic table, as a catalyst, cooling the resulting gas mixture to a temperature below the boiling point of hydrogen cyanide but above the boiling point of cyanogen, whereby said hydrogen cyanide is condensed, and then washing the cyanogen so purified with water, whereby traces of hydrogen cyanide dissolved in said cyanogen are removed.

4. The method of making pure cyanogen by decomposition of hydrogen cyanide which comprises contacting hydrogen cyanide at a temperature of at least 300° C. with a catalyst consisting of platinum and palladium.

5. The method as in claim 1 wherein said temperature is between about 300° and about 800° C.

6. The method as in claim 1 wherein said catalyst is a mixture of at least two platinum metals.

7. The method as in claim 1 wherein said hydrogen cyanide is diluted with an inert gas.

8. The method as in claim 1 wherein said catalyst comprises at least one of said metals with minor amounts of a metal of group IB of the periodic table.

9. The method of making pure cyanogen by decomposition of hydrogen cyanide which comprises contacting hydrogen cyanide at a temperature of at least 300° C. with a catalyst consisting of platinum and palladium, said metals being deposited on kieselguhr as carrier.

References Cited in the file of this patent

UNITED STATES PATENTS 1,492,193   Beindl _____ Apr. 29, 1924

OTHER REFERENCES

Williams: "Cyanogen Compounds," Edward Arnold and Co., London, 2d ed., 1948, page 1.